No. 621,264. Patented Mar. 14, 1899.
W. MADISON.
FRUIT OR VEGETABLE CUTTER.
(Application filed Mar. 28, 1898.)
(No Model.) 3 Sheets—Sheet 2.
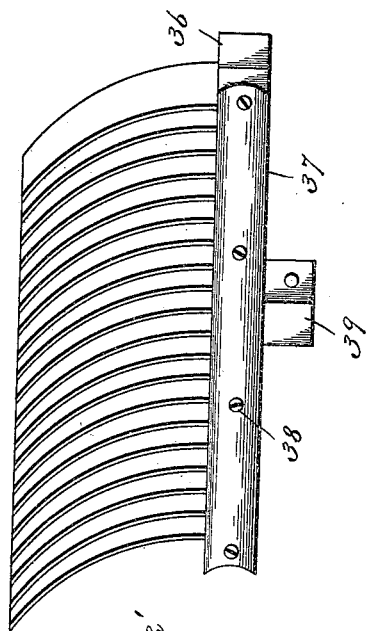
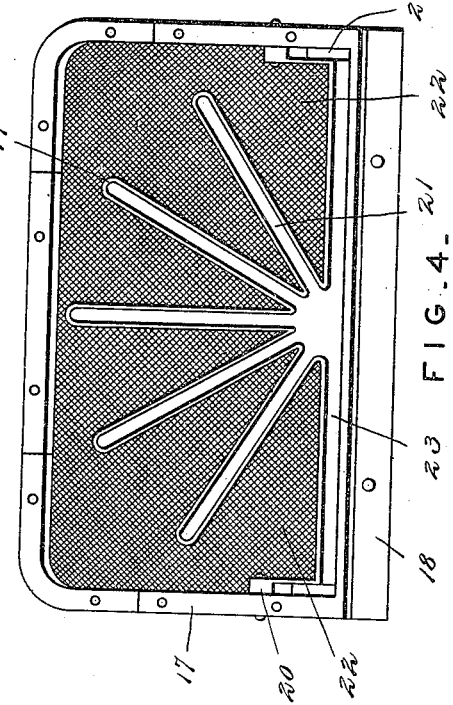
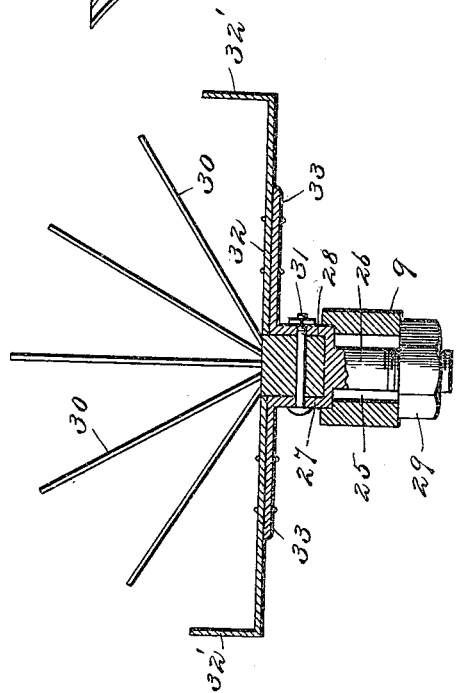
Witnesses
Harry L. Ames
C. N. Walker
Inventor
William Madison
by V. S. Stockbridge
his Attorney No. 621,264. Patented Mar. 14, 1899.
W. MADISON.
FRUIT OR VEGETABLE CUTTER.
(Application filed Mar. 28, 1898.)

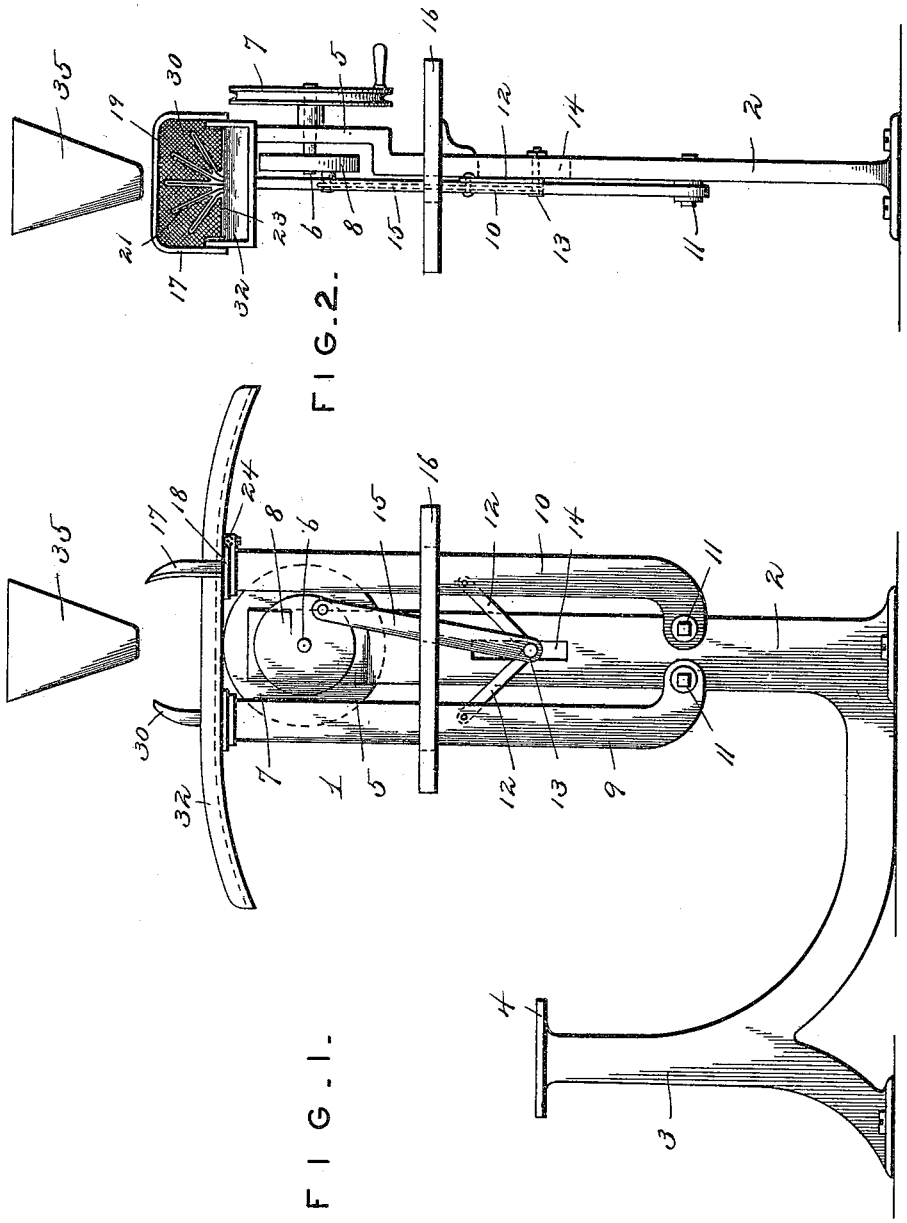

(No Model.) 3 Sheets—Sheet 3.

Witnesses
Harry L. Amer.
C. N. Walker.

Inventor
William Madison.
By V. D. Stockbridge
His Attorney

UNITED STATES PATENT OFFICE.

WILLIAM MADISON, OF LOS GATOS, CALIFORNIA.

FRUIT OR VEGETABLE CUTTER.

SPECIFICATION forming part of Letters Patent No. 621,264, dated March 14, 1899.

Application filed March 28, 1898. Serial No. 675,479. (No model.)

*To all whom it may concern:*

Be it known that I, WILLIAM MADISON, a citizen of the United States, residing at Los Gatos, in the county of Santa Clara and State of California, have invented certain new and useful Improvements in Fruit or Vegetable Cutters; and I do hereby declare the following to be a full, clear, and exact description of the invention, such as will enable others skilled in the art to which it appertains to make and use the same.

The object of my invention is the provision of an improved machine for cutting and slicing fruits and vegetables which will be adapted to operate in a novel manner, whereby the proper treatment of the fruit or vegetables will be insured; and to this end the invention comprises certain parts of peculiar construction adapted to coact in a novel manner, as will more fully appear hereinafter.

In the accompanying drawings, Figure 1 is a side elevation; Fig. 2, an end elevation; Fig. 3, a detail of the fingers and holder therefor used when fruit is to be sliced; Fig. 4, a detail vertical section of the knives and holder therefor used when fruit is to be sliced; Fig. 5, a detail perspective of the fingers and holder therefor used when vegetables are to be cut, and Fig. 6 a detail perspective of the knives and holder therefor used in cutting vegetables. Fig. 7 represents a central vertical section on a line parallel to the side elevation shown in Fig. 2.

The machine-frame 1 has main and supplemental uprights 2 and 3, the latter being provided with a horizontal shelf or platform 4, adapted to receive the sliced fruit or vegetables. The upper portion of upright 2 is offset at 5, and a shaft 6 is journaled in this offset portion. A grooved crank-wheel 7 is carried by one end of the shaft and a crank or crank-disk 8 by the other end thereof. There are two arms 9 and 10, which are pivoted to the main upright at their lower ends at 11, so as to be capable of movement toward and away from each other. Toggle-levers 12 are pivoted to the respective arms and are also pivoted to a cross-head 13, which is adapted for movement in a vertical slot 14 in the main upright. A pitman 15 connects cross-head 13 to the crank-disk. A guard 16, connected to the main upright, surrounds the arms and pitman.

The fingers and frame therefor that direct the fruit to the cutting-knives are carried on the upper end of arm 10. A frame 17 of substantially rectangular shape has its base 18 secured to the upper end of arm 10, and the upper end of this frame curves over toward arm 9 for the purpose of holding the fruit down on the table, (to be described later,) so that the knives can properly act thereon. Separate spring-metal fingers 19 are secured to the frame at 20, and they all converge to the center point of the base of the frame, being separated by the spaces 21, through which the knives (hereinafter described) pass when the machine is in operation. The fingers curve the same as the frame or holder which secures them, and they are preferably covered with rubber 22 to prevent injury to the fruit. The lowermost fingers are separated from the base of the frame and also the sides thereof by a space 23, which receives the cutting-table, (described later on.)

The numeral 24 designates a roller which is journaled to the upper end of arm 10, and this roller supports the cutting-table.

The cutting or slicing mechanism is carried on the upper end of arm 9. The arm 9 has a horizontally-extending opening 25 near its upper extremity.

The numeral 26 designates a bolt having a square head 27, provided with a vertically-disposed square opening 28. The shank of this bolt passes through the opening 25, and a nut 29 on the bolt holds the squared head of the latter snugly in the countersunk portion of the opening, so that the bolt is prevented from turning.

The numerals 30 designate a plurality of curved knives corresponding in number to the spaces 21, through which they are adapted to pass. The lower ends of these knives are fitted in the opening 28 and are secured by a bolt 31, which passes through them and the head 27 horizontally. The outermost knives have their points projected somewhat farther than the remaining knives in order to more effectually slice the fruit. There is a cutting-table 32, which is composed of two overlapped pieces having sides 32' and which are cut out to accommodate the knives and are secured to arms 33, extending out from opposite sides of the head 27. This table has one end curved at 34 and adapted to deliver the sliced fruit or vegetables onto the platform 4, while the other portion of the table rests on the roller 24 and works freely through the space 23. Immediately above the cutting-table and between the fingers and cutting-knives is a feed-hopper 35, having an inclined apertured bottom through which the fruit or vegetables pass and then fall onto the cutting-table.

When vegetables instead of fruit are to be sliced, the fingers and knives shown in Figs. 5 and 6 are substituted for those heretofore described.

Referring first to Fig. 5, the frame 17 is employed, as before, and its upper portion is inclined toward the center of the machine. The vertical separated fingers 19' are narrow and curved in such manner that they are adapted to hold the vegetables against the cutting-table during the treatment thereof. All of these fingers depend from the upper portion of the frame or holder.

In Fig. 6 a holder 36 is employed, together with a semicylindrical clamp-bar 37, which is held in notches in the knives by bolts 38, passing through said clamp-bar and the holder. The holder has a square stem or shank 39, adapted to fit into the opening 25 in the arm 9. It will be observed that the knives are disposed vertically and are adapted to pass through the spaces separating the fingers.

The operation is as follows: The handle to the crank-wheel is turned by hand or it can be belted to a suitable motor, whereupon the movement of the pitman causes an alternate spreading and contraction of the toggle-levers, and the arms approach toward and recede from each other. During these movements the fruit or vegetables have fallen on the cutting-table and are there cut by the knives passing between the fingers, which latter hold the material being operated on. The slices pass between the knives and are shaken off at the curved end of the cutting-table by reason of the reciprocations thereof and then fall on the receiving-platform. The coöperation of the members of the actuating mechanism is such that the operation of the machine is rendered extremely easy.

Having thus described my invention, what I claim as new, and desire to secure by Letters Patent, is—

1. In a machine of the class described, the combination with a main frame-upright, of upright arms pivoted at their lower ends thereto, toggle-levers connecting said arms, means for moving the knee of the said levers, cutting mechanism carried by one arm, a device carried by the other arm adapted to coact with the cutting mechanism to accomplish the cutting operation, and a table carried by one of said arms for upholding the material to be acted upon to the action of said cutting mechanism.

2. In a machine of the class described, the combination with a main frame having a guideway, of upright arms pivoted to the main frame, toggle-levers pivoted to and connecting said arms, an intermediate cross-head pivoted to the levers and working in the guideway in the frame, a crank-disk, means for turning said disk, a pitman connecting the cross-head with said crank-disk, a plurality of cutters carried by one arm, means carried by the other arm adapted to coact with the cutters to accomplish the cutting operation, and a table carried by one of said arms for upholding the material to be operated upon.

3. In a machine, of the class described, the combination with movable members, of a plurality of curved cutters carried by one member and curved fingers carried by the other member adapted to intermesh with the cutters during the operation of the machine, and a table carried by one of said arms for upholding the material to be operated upon.

4. In a machine of the class described, the combination with movable members, of a plurality of cutting-knives carried by one member, a plurality of resilient fingers carried by the other member adapted to coact with the knives, and a supporting-table carried by one of said arms for the material to be operated upon to rest on, substantially as described.

5. In a machine of the class described, the combination with movable members, of a plurality of upright cutters carried by one member, upright, curved fingers carried by the other member adapted to intermesh with the cutters, and a horizontal cutting-table carried by one of said members and adapted to hold the material to be acted on by the fingers and cutters.

6. In a machine of the class described, the combination with movable members, of a cutting-table connected to one of the members and movable in relation to the other member, cutting mechanism carried by one member and means carried by the other member adapted to direct the material to be cut to the cutting mechanism.

7. In a machine of the class described, the combination with movable members, of a horizontal table, upright, curved cutting-knives connected to and moving with one member and overhanging the table, and upright, curved fingers connected to the other member and also overhanging the table and moving relatively thereto, substantially as described.

8. In a machine of the class described, the combination with movable members, of a table connected to one member, a roller carried by the other member on which the table runs, cutting-knives carried by one member and overhanging the table and fingers carried by the other members which also overhang the table.

9. In a machine of the class described, the combination with members movable toward and away from each other, and means for moving said members, of cutting-knives carried by one of the members, fingers carried by the other member, a cutting-table having upright sides and connected to the member which carries the knives, said table having a free downwardly-extending delivery end and adapted to move relatively to the fingers and a feed-hopper disposed above that portion of the table located between the knives and fingers.

10. In a machine of the class described, the combination with movable members, one of which has an opening, of a holder having a portion secured in said opening, knives secured in the holder, a frame or holder secured to the other member, fingers secured to said frame, and a table secured to the member carrying the knife-holder and through which the fingers carried by said frame work, substantially as described.

In testimony whereof I affix my signature in presence of two witnesses.

WILLIAM MADISON.

Witnesses:
  JOHN HAMILTON,
  B. H. NOBLE.